United States Patent
Roy et al.

(10) Patent No.: US 10,275,836 B2
(45) Date of Patent: Apr. 30, 2019

(54) MANAGING GROUP PLAY IN LOTTERY DRAWS

(75) Inventors: Serge Roy, St. Joseph-du-Lac (CA); Cameron Adams, Kamloops (CA); George Rassias, Toronto (CA); Jason Lam, Vancouver (CA); Ken Schulzke, Winnipeg (CA); Louis-Phillippe Lussier, Moncton (CA); Todd Heintz, Vancouver (CA)

(73) Assignee: INTERPROVINCIAL LOTTERY CORPORATION, Toronto (CA)

( * ) Notice: Subject to any disclaimer, the term of this patent is extended or adjusted under 35 U.S.C. 154(b) by 410 days.

(21) Appl. No.: 14/123,405

(22) PCT Filed: May 31, 2012
(Under 37 CFR 1.47)

(86) PCT No.: PCT/CA2012/050360
§ 371 (c)(1),
(2), (4) Date: Jul. 30, 2015

(87) PCT Pub. No.: WO2012/162835
PCT Pub. Date: Dec. 6, 2012

(65) Prior Publication Data
US 2015/0332540 A1    Nov. 19, 2015

Related U.S. Application Data

(60) Provisional application No. 61/492,665, filed on Jun. 2, 2011.

(51) Int. Cl.
*G06Q 50/00* (2012.01)
*G07F 17/32* (2006.01)
(Continued)

(52) U.S. Cl.
CPC ............. *G06Q 50/01* (2013.01); *G06Q 30/06* (2013.01); *G06Q 40/02* (2013.01); *G07F 17/329* (2013.01);
(Continued)

(58) Field of Classification Search
CPC .................................................. G07F 17/3258
See application file for complete search history.

(56) References Cited

U.S. PATENT DOCUMENTS 6,206,782 B1 * 3/2001 Walker .................... G07F 17/32
463/20
8,517,811 B2 * 8/2013 Pollard ................. G07F 17/329
463/17

(Continued)

FOREIGN PATENT DOCUMENTS

CA        2659040 A1    9/2010
WO    2010048540 A1    4/2010

OTHER PUBLICATIONS

WIPO, International Search Report and Written Opinion dated Aug. 15, 2012, issued in corresponding PCT application No. PCT/CA2012/050360.

(Continued)

*Primary Examiner* — Dmitry Suhol
*Assistant Examiner* — Ankit Doshi
(74) *Attorney, Agent, or Firm* — Norton Rose Fulbright Canada LLP

(57) ABSTRACT

There is described herein an online lottery application providing single play and group play in a structured and clear manner. Group play is designed to set out playing and winning conditions such that all members of the group are aware of them and adhere to them. Ticket checking and validation for group play is simplified and facilitated by the online lottery application.

20 Claims, 18 Drawing Sheets

(51) Int. Cl.
*G06Q 40/02* (2012.01)
*G06Q 30/06* (2012.01)

(52) U.S. Cl.
CPC ...... *G07F 17/3244* (2013.01); *G07F 17/3272* (2013.01)

(56) References Cited

U.S. PATENT DOCUMENTS

| | | | |
|---|---|---|---|
| 2007/0093298 A1 | 4/2007 | Brunet | |
| 2009/0271247 A1* | 10/2009 | Karelin | G06Q 10/10 705/319 |
| 2010/0105462 A1* | 4/2010 | Walker | G07C 15/006 463/17 |
| 2010/0203942 A1 | 8/2010 | Walker et al. | |
| 2011/0059786 A1* | 3/2011 | Walker | G07F 17/3276 463/17 |
| 2011/0070945 A1* | 3/2011 | Walker | G07F 17/3258 463/25 |

OTHER PUBLICATIONS

WIPO, International Preliminary Report on Patentability dated Dec. 12, 2013, issued in corresponding PCT application No. PCT/CA2012/050360.

\* cited by examiner

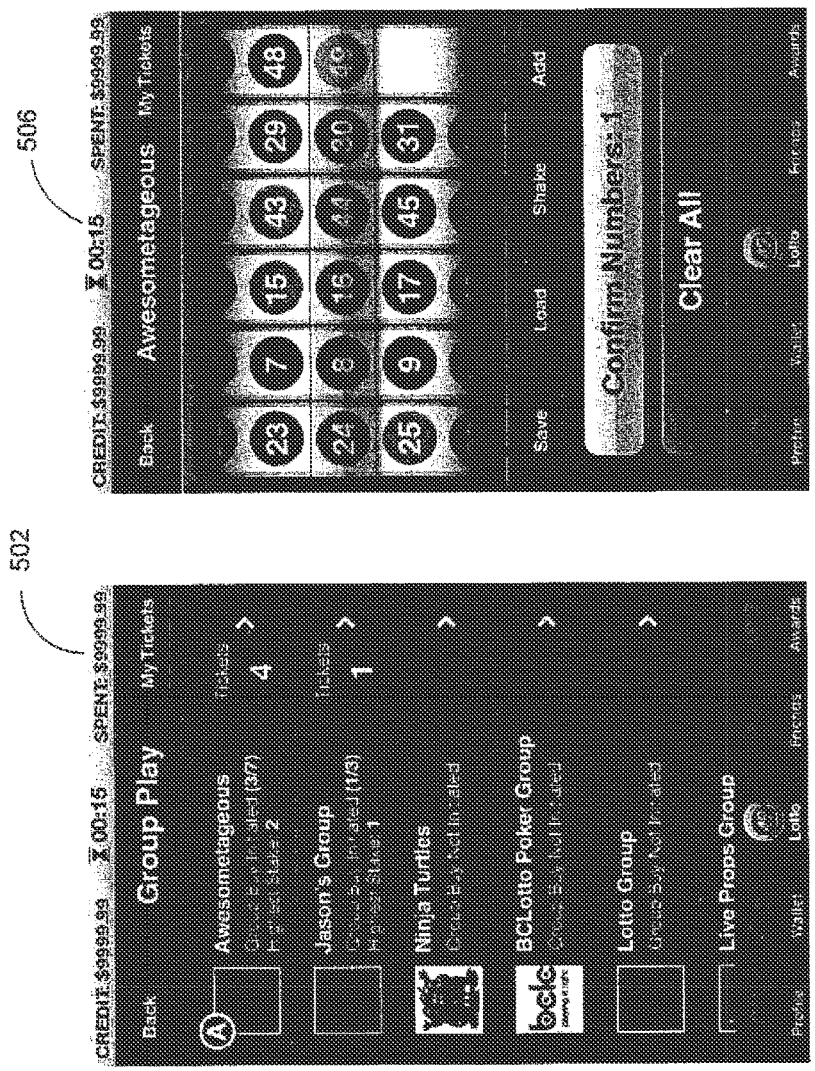

MANAGING GROUP PLAY IN LOTTERY DRAWS

CROSS-REFERENCE TO RELATED APPLICATIONS

The present application claims priority under 35 USC 119(e) of U.S. Provisional Patent Application No. 61/492,665, filed on Jun. 2, 2011, and international Application Number PCT/CA2012/050360 filed May 31, 2012, the contents of which are hereby incorporated by reference.

TECHNICAL FIELD

The present invention relates to the field of gaming and more particularly, to an application for managing groups wishing to participate in one or more lottery draws.

BACKGROUND OF THE ART

A lottery is a form of gambling which involves the drawing of lots for a prize and it may come in various formats. For example, the prize can be a fixed amount of cash or goods. Alternatively, the prize may be a fixed percentage of the receipts, such as a "50-50" draw, where the prize is 50% of the revenue.

Government sanctioned lotteries are found in many countries and are usually run by one or more organizations over a given territory. The draws take place on a regular basis, such as once a week, and a jackpot may or may not be won for each draw. Players can typically purchase a ticket at any one of various locations in the given region. The player will select numbers or be attributed numbers randomly, and a paper ticket is generated. In order to redeem any winnings, the player must present the paper ticket to one of the various locations officially recognized for this purpose.

There is a need to modernize the government sanctioned lottery industry in order to take advantage of the evolution of technology, the advent of social networking, and the popularity of online gaming.

SUMMARY

There is described herein an lottery application providing single play and group play in a structured and clear manner. Group play is designed to set out playing and winning conditions such that all members of the group are aware of them and adhere to them. Ticket checking and validation for group play is simplified and facilitated by the online lottery application.

In accordance with a first broad aspect, there is provided a system for managing participation of a group in a lottery draw. The system comprises a processor in a computer system; a memory accessible by the processor; and at least one application stored in the memory and having program code executable by the processor. The program code is executable for: receiving ticket purchase selections for at least one lottery draw, at least one of the ticket purchase selections corresponding to a group purchase from a group having at least two members participating in the at least one lottery draw, each one of the ticket purchase selections associated with at least one player account; receiving a set of draw numbers corresponding to a winning combination for the at least one lottery draw; determining if any of the ticket purchase selections constitute a partial or complete winning combination; and allocating winnings to the at least one player account associated with a winning ticket purchase selection from the group in accordance with a set of predetermined conditions dictating participating and non-participating group member stakes for the group for the at least one lottery draw.

In accordance with a second broad aspect, there is provided a method for managing participation of a group in a lottery draw, the method comprising: receiving ticket purchase selections for at least one lottery draw, at least one of the ticket purchase selections corresponding to a group purchase from a group having at least two members participating in the at least one lottery draw, each one of the ticket purchase selections associated with at least one player account; receiving a set of draw numbers corresponding to a winning combination for the at least one lottery draw; determining if any of the ticket purchase selections constitute a partial or complete winning combination; and allocating winnings to the at least one player account associated with a winning ticket purchase selection from the group in accordance with a set of predetermined conditions dictating participating and non-participating group member stakes for the group for the at least one lottery draw.

In accordance with a third broad aspect, there is provided a computer readable medium having stored thereon program code executable by a processor for managing participation of a group in a lottery draw by: receiving ticket purchase selections for at least one lottery draw, at least one of the ticket purchase selections corresponding to a group purchase from a group having at least two members participating in the at least one lottery draw, each one of the ticket purchase selections associated with at least one player account; receiving a set of draw numbers corresponding to a winning combination for the at least one lottery draw; determining if any of the ticket purchase selections constitute a partial or complete winning combination; and allocating winnings to the at least one player account associated with a winning ticket purchase selection from the group in accordance with a set of predetermined conditions dictating participating and non-participating group member stakes for the group for the at least one lottery draw.

In this specification, the term "lottery" refers to a draw with a randomly or pseudo-randomly determined outcome. The term "gifter" refers to a player offering part or all of a lottery ticket to another player or non-player as a gift. The term "giftee" refers to the recipient of the gift.

BRIEF DESCRIPTION OF THE DRAWINGS

Further features and advantages of the present invention will become apparent from the following detailed description, taken in combination with the appended drawings, in which:

FIG. 6a is a screen shot illustrating an exemplary page for selecting a group;

FIG. 6b is a screen shot illustrating an exemplary page for selecting numbers of a group ticket;

FIG. 10a is a screen shot illustrating an exemplary page for selecting a draw for viewing;

FIG. 10b is a screen shot illustrating an exemplary page displaying the selected draw;

It will be noted that throughout the appended drawings, like features are identified by like reference numerals.

DETAILED DESCRIPTION

There is described herein an online lottery application. The application may be used for government sanctioned lotteries in a single region or in multiple regions. The application may also be used for private lotteries operated within a given social or geographical group.

Figure 1:
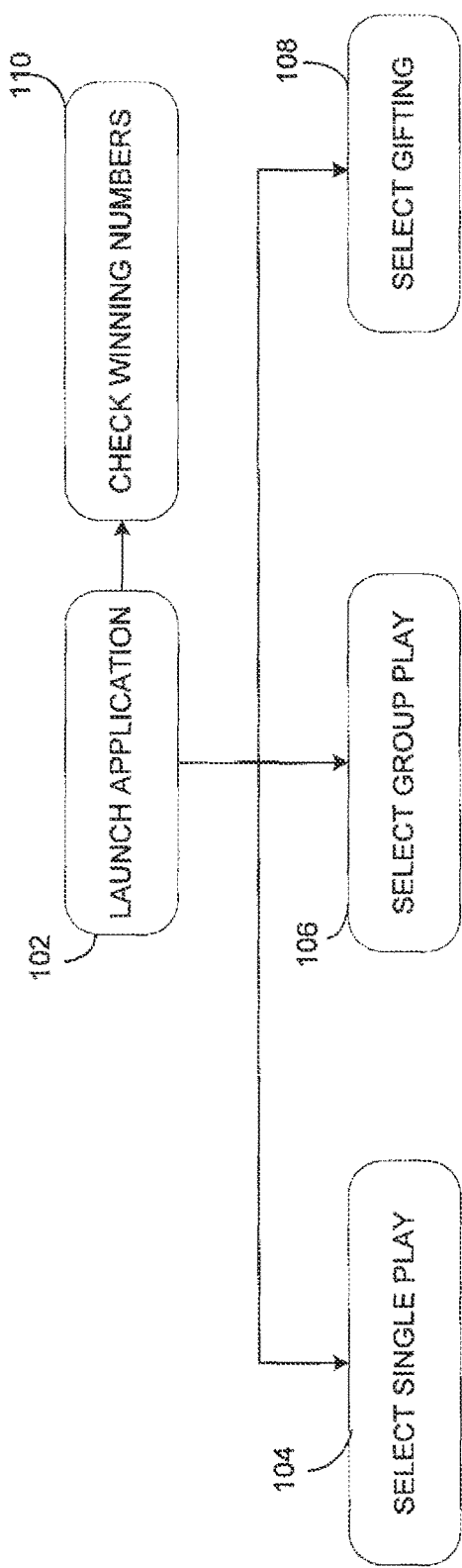
FIG. 1 is a flowchart illustrating the available modes for the lottery application, in accordance with one embodiment.
Figure 2:
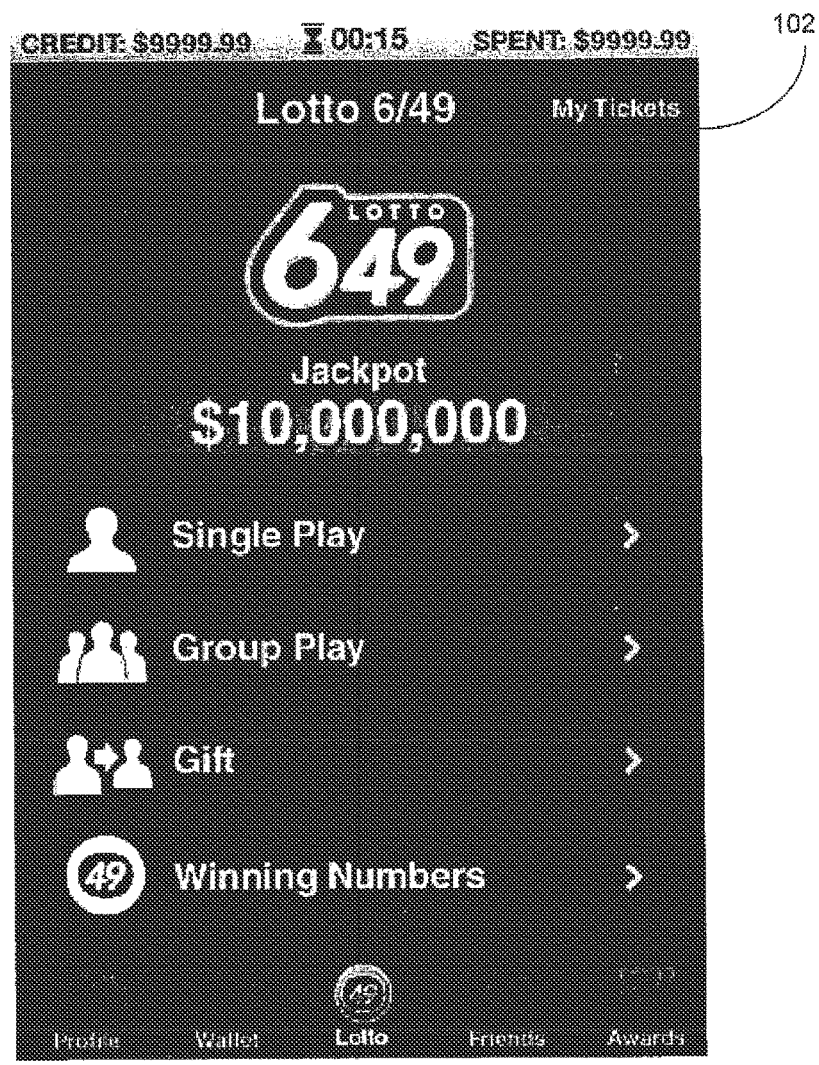
FIG. 2 is a screen shot illustrating an exemplary start page for the lottery application.

FIG. 1 illustrates the options available to the player upon launching the application 102. The player may select single play 104, group play 106, or gifting 108. In addition, the player may choose to view winning numbers 110 for a present or past draw, and/or details of the player's purchases for any given draw. FIG. 2 is a screen shot illustrating an exemplary start page for the application. In the present case, the application is for a Lotto 6/49™ lottery, with a jackpot of 10,000,000$. Alternatively, a single application may be provided for multiple lotteries, such as Lotto 6/49™, Lotto Max™, Lotto Poker™, and Banco™. These lotteries all form part of the multiple lotteries offered by Lotto-Quebec, a government sanctioned lottery operator in Canada. In this case, upon launching the application, the player may be asked to select a lottery from a list of available lotteries, and after selecting Lotto 6/49™, the player is directed to the home page for this lottery, as illustrated in FIG. 2.

In another embodiment, the options available to the player upon launching the application 102 are presented differently than that illustrated in FIG. 2. For example, the winning numbers option may be provided within each one of single play and group play options. Also alternatively, the gift option may be provided within the single play option. Those skilled in the art will recognize that the layout of FIG. 2 is for illustration purposes only and may be modified in various ways.

Figure 3:
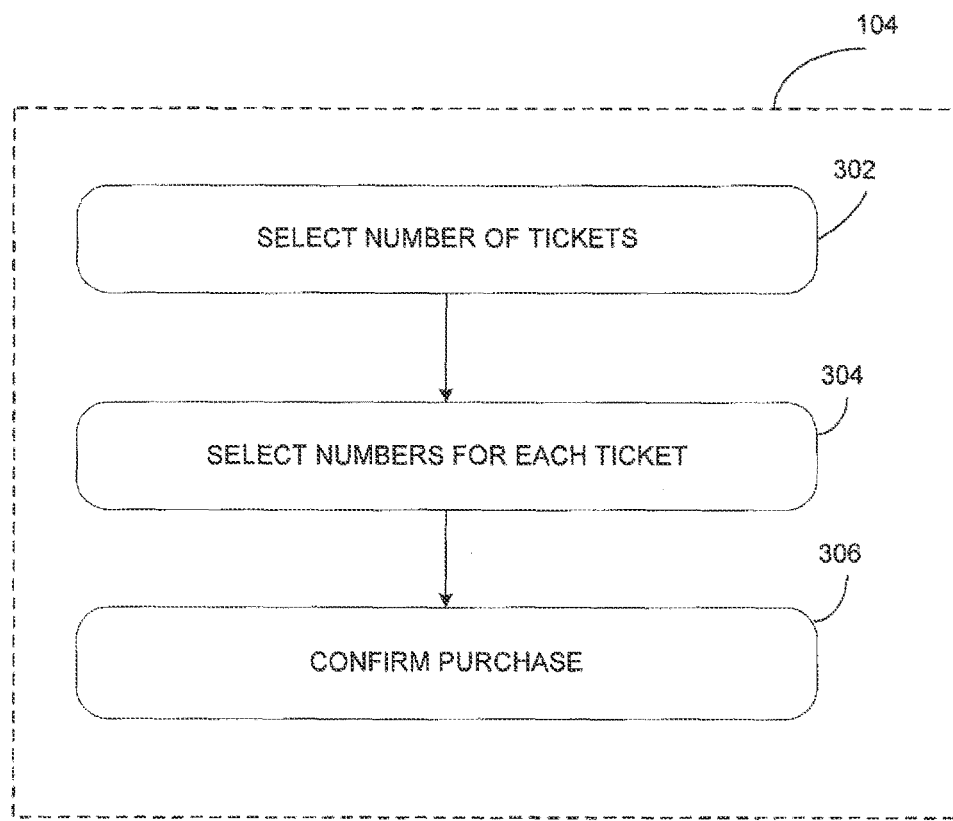
FIG. 3 is a flowchart illustrating an exemplary method for single player play.

FIG. 3 is an exemplary method for single player play 104. The player is asked to select a number of tickets to be purchased 302, select numbers for each ticket 304, and confirm the purchase 306. In one embodiment, the player may select numbers for a ticket 304 and then be asked whether he wants to purchase a second ticket 302. In the affirmative, the player would then select numbers for the second ticket and be asked whether he wants to purchase a third ticket, and so on, until the player has purchased all of the tickets he wishes to purchase. In yet another embodiment, the player may indicate himself that he wishes to purchase another ticket after having purchased a first ticket.

Figure 4B:
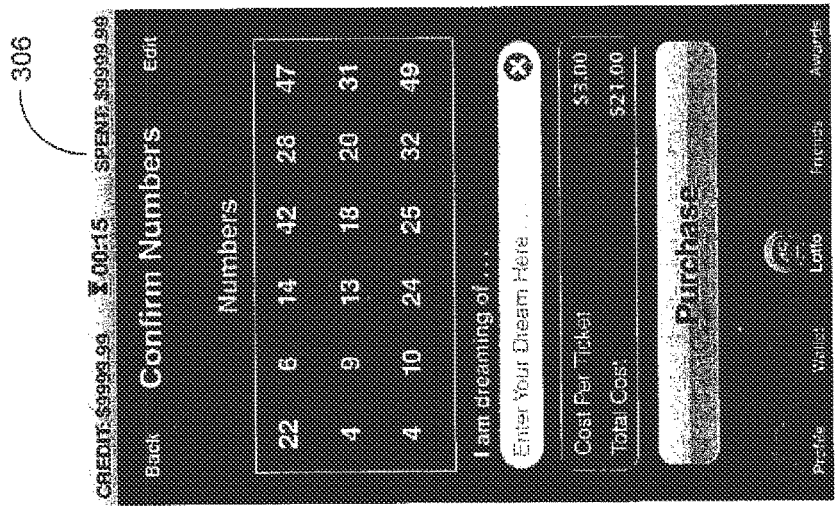
FIG. 4b is a screen shot illustrating an exemplary page for confirming a purchase a ticket.
Figure 4A:
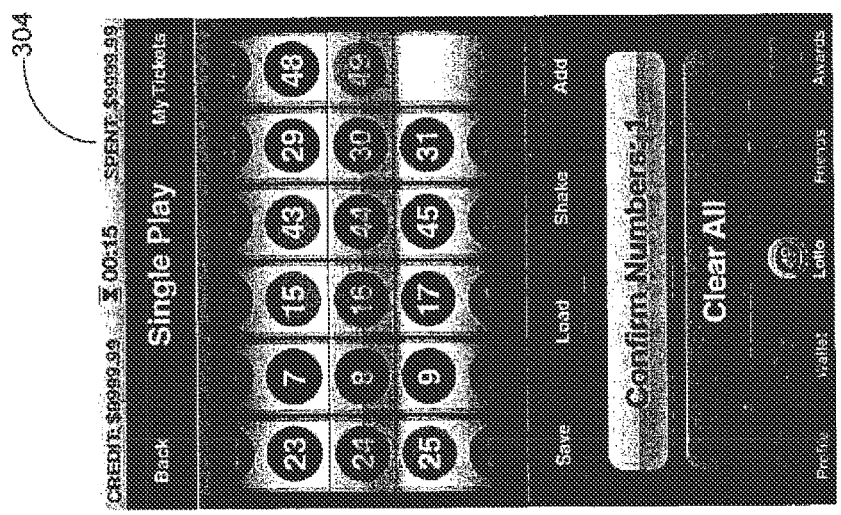
FIG. 4a is a en shot illustrating an exemplary page for selecting numbers of a ticket.

FIG. 4a is a screen shot illustrating an exemplary page for selecting numbers for a ticket. In one embodiment, the possible numbers are illustrated in a matrix of rows and columns, each column corresponding to one number on the ticket and the central row corresponding to the selected numbers. The player may select each number of the ticket non-randomly by placing the desired number in the central position of each column. Alternatively, a blank field may be provided, whereby the player may input a number. In another embodiment, the player may choose a random or pseudo-random manner of selecting the numbers of a ticket. For example, there may be a key available which when selected, will generate a number for the ticket. Alternatively, the player may shake a mobile device in order to select the numbers of the ticket. In this case, the various sensors of the mobile device, such as accelerometers or motion sensors, are used to detect the motion when the application has been set to "shake" mode. When detecting the motion, the columns of numbers for each number position are moved up and down in accordance with the motion sensed. When the shaking stops, the numbers that appear in the central row of the matrix of numbers is officially selected as the ticket combination.

FIG. 4b is a screen shot illustrating an exemplary page for confirming one or more purchased tickets. In this example, seven tickets are being purchased, at a cost of 3.00$ per ticket, for a total cost of 21.00$. Three of the seven tickets are visible in a window, the others may also be viewed by scrolling down in the window. Once the player selects the "purchase" button, the purchase is confirmed and a transaction occurs.

As illustrated in the upper right hand and left hand corners of FIGS. 4a and 4b, the player is using a given currency to make purchases. In one embodiment, the currency is actual money from the real world. Purchases are made directly with real currency from a player account. In another embodiment, the currency used to make purchases is a virtual currency embodied by credits, tokens, etc, and having an equivalent in a real world currency. The equivalent may be 1:1 or it may be as a function of a ratio set by the lottery operator or by some other entity. In this embodiment, the player may purchase credits in order to participate in the online lottery draw. This facilitates transactions and player account management as the transactions with real money will only occur when players purchase a given number of credits or redeem their credits for the real world currency. The purchased credits will then be used at will by the player until they run out. Credits can be repurchased at any time, whether the outstanding balance of credits in a player's account is zero or non-zero. In one embodiment, the application will illustrate at all times the balance of the player's account and the amounts that have been spent. These numbers may be provided per session, per day, per game, per week, etc. In another embodiment, the player may access a profile page having detailed information regarding remaining currency, spent currency, past transactions, and past purchases and/or redemptions of credits.

In one embodiment, the player is asked to enter a wish whenever a lottery ticket is purchased, the wish being related to what the player would do with his winnings. For example, the player may indicate "I dream of buying a 1925 Mercedes-Benz", or "I dream of buying a villa in the south of France". This entry may be linked to the player's social network page, such as Facebook™, MySpace™, or Twitter™. When a new ticket is purchased and a "dream" is entered, an update is provided to the player's social network page for friends of the player to see. Alternatively, a social network is integrated into the online lottery application for all players of the lottery game. In this instance, players may post new purchases (group or single play), comment on other players' purchases, send gifts to other players, and allow other players to see social activity within the lottery community as desired. New entries of a "dream" may then be posted to the player's lottery social network page.

Figure 4C:
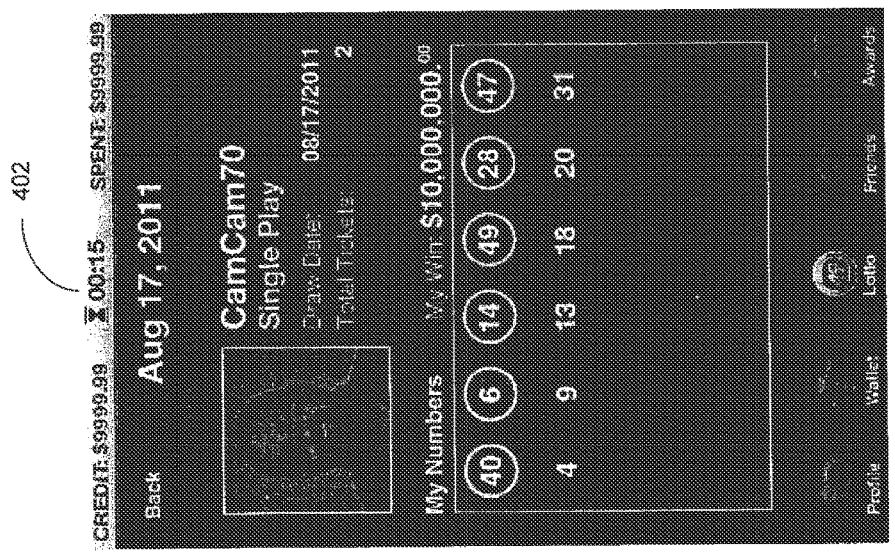
FIG. 4c is a screen shot illustrating an exemplary page for viewing the detail of a single play purchase.

FIG. 4c is a screen shot illustrating purchase details for single play 402. Any player information may be provided on this page, such as a draw date, a number of tickets purchased and the ticket combinations. A purchase for a past draw may also indicate which numbers were drawn and if any of the tickets were winning tickets. A purchase for a future draw may indicate that the draw has not yet taken place.

Figure 5:
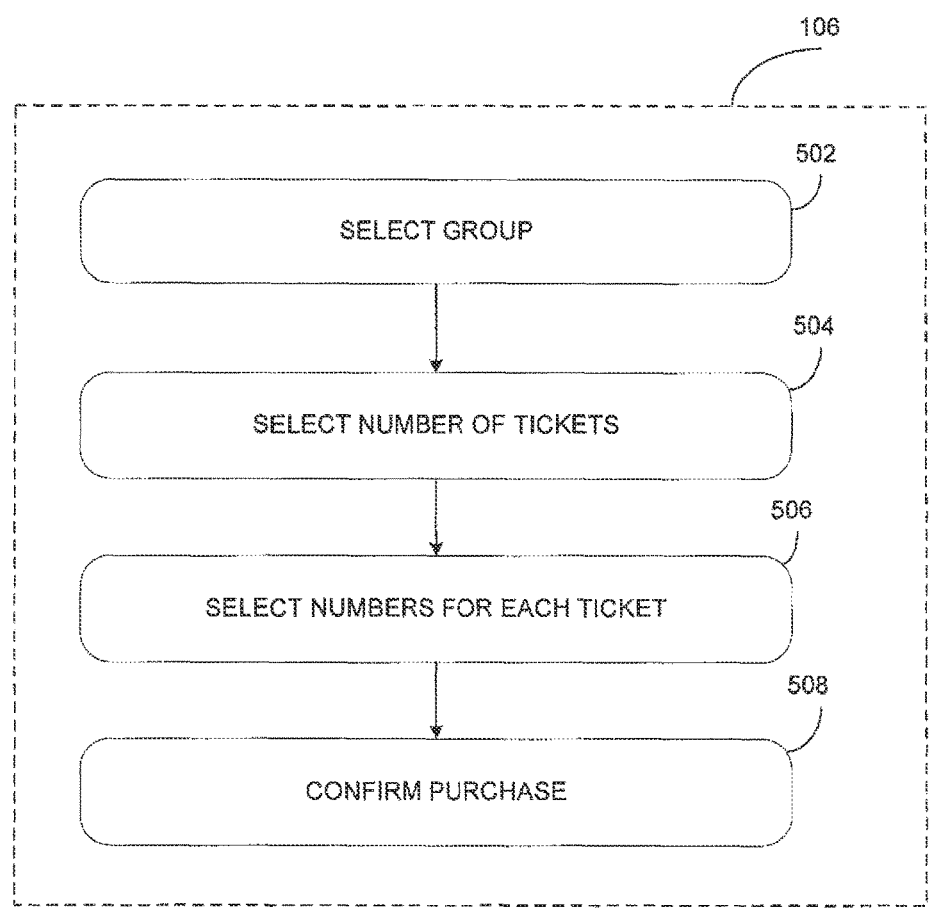
FIG. 5 is a flowchart illustrating an exemplary method for group play.

FIG. 5 is a flowchart illustrating an exemplary method for group play 106. Group Play allows the members of the group to pool their money together to increase their chances of winning the lottery. The player may be part of one or more groups and therefore, is asked to select a group from a list of available groups 502. Once the group for which the one or more tickets to be purchased is selected, the player is asked to select a number of tickets 504, select numbers for each ticket 506, and confirm the purchase 508. Similarly to single play, the order of the steps may be modified, such that a player selects numbers for only one ticket and then decides to purchase other tickets.

FIG. 6a is a screen shot of an exemplary page for selecting a group 502 for group play 106. Some groups may already have tickets purchased while others may not. In either case, any member of the group may add tickets to the group's pot. Some of the information displayed for the player are the number of initiated purchases for the group, the total number of tickets purchased by the group, and the highest stake of any group member. In the embodiment illustrated, a group member who purchases more than one ticket will have a higher stake in the winnings compared to the other members of the group. For example, if two out of three members buy one ticket and the third member buys three tickets, everyone in the group will receive winnings if any of the five tickets are a winning ticket, but the member who purchased three tickets will receive a share of the winnings that is three times greater than the share received by the other two members.

In the group called "Awesometageous" as illustrated in FIG. 6a, there are seven members of the group and three of the seven have initiated a purchase for the group (3/7). Four tickets have been purchased in all, but one member has purchased two tickets, giving this member a stake of 2:1 compared to the other members of the group. For the group called "Jason's Group", there are three members and only one has initiated a purchase. A single ticket has been purchased and therefore the highest stake is 1.

In an alternative embodiment, every member of the group receives an even share of the winnings, regardless of the number of tickets purchased by the individual member for the group. In another alternative embodiment, only members who have initiated a purchase may collect winnings from a winning ticket. This encourages each member of the group to purchase at least one ticket for the group. Various combinations of these embodiments are also possible. The online lottery application may be designed to allow any one of these embodiments and each group may choose which settings they wish to operate under. These settings are then visible to the entire group and cannot be disputed, in the case of a disagreement on who should collect the winnings. This will be explained in more detail below.

FIG. 6b is a screen shot illustrating an exemplary page for selecting numbers for a group ticket 506. The embodiments described above for single play ticket selection are also applicable for group play ticket selection. In addition, the page displays the name of the group for which the ticket is being purchased.

Figure 6C:
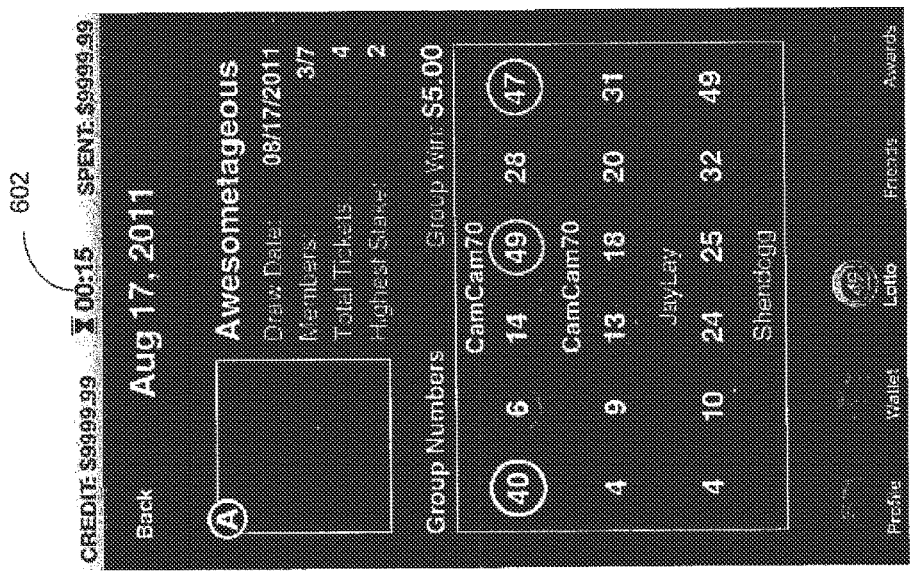
FIG. 6c is a screen shot illustrating an exemplary page for vie wring the details of a group purchase.

FIG. 6c is a screen shot illustrating an exemplary page for viewing details of a given group's purchases 602. Any group information may be provided on this page, such as a list of members, members who purchased tickets, the stakes of each member, and a draw date. Tickets may be identified with the purchasing member or not. Total winnings for the group may be displayed. A purchase for a past draw may also indicate which numbers were drawn and if any of the tickets were winning tickets. A purchase for a future draw may indicate that the draw has not yet taken place.

The design of the online lottery application with regards to group play allows easy and clear management of the group tickets and purchases. An administrator may de designated, for example the person who creates the group. The settings of the game act as the group contract, which is usually set out in order to ensure that all members of the group agree to a set of playing conditions. The settings may be determined either by the lottery operator or by the group administrator. For example, jackpot amount, draw date, cost per play and cut-off time for purchase are all settings that can be determined by the lottery operator. Prize splitting, reinvestment of winnings into future draws, consequences of absences of group members during draws (due to vacations, illnesses, life events), and stakes per player are settings that can be determined by the group administrator. Other variations on settings and who, of the group administrator and the lottery operator, will be determining them are also possible. In one embodiment, the group terms and conditions are displayed to the group members before they accept an invitation to join the group and they must confirm their agreement to these terms and conditions before being added to the group. In another embodiment, the terms and conditions are inherently confirmed by virtue of the player accepting to join the group.

Thanks to the application and its design, there is no need to perform some of the usual steps required to regulate group play of a lottery draw. Some examples of steps that are no longer required are signing the ticket immediately after the purchase, writing "In Trust" by the signature line to show that this is a group play ticket, making copies or computer scans of the ticket for each group member so everyone has a copy of the selected numbers, saving a copy, updating it, and resending any new tickets to each group member every time the group plays. There are significant legal and logistic gains provided by the online lottery application. In the presently described online lottery application, a ticket purchased under a group profile is automatically tagged as a "group ticket" in the system, and the group members are clearly identified. The settings dictating playing conditions of the group are also pre-set and known to all players. The system is transparent to every member of the group as the same information regarding purchased tickets and numbers from a draw are provided equally to each player.

Checking the ticket after the draw is also simplified by the present application. The numbers of the draw may be automatically pushed to the players, or they may be pulled by the players when available. With regards to validation, there is no need to find a validation terminal or an authorized retailer in order to validate the ticket. The ticket may be validated directly online and winnings may be allocated to a group or a player in an automated fashion by having the currency provided directly into a player or group's account. In one embodiment, the winnings may be automatically split by group member and allocated in each group member's player account in accordance with the pre-determined playing conditions.

Figure 7:
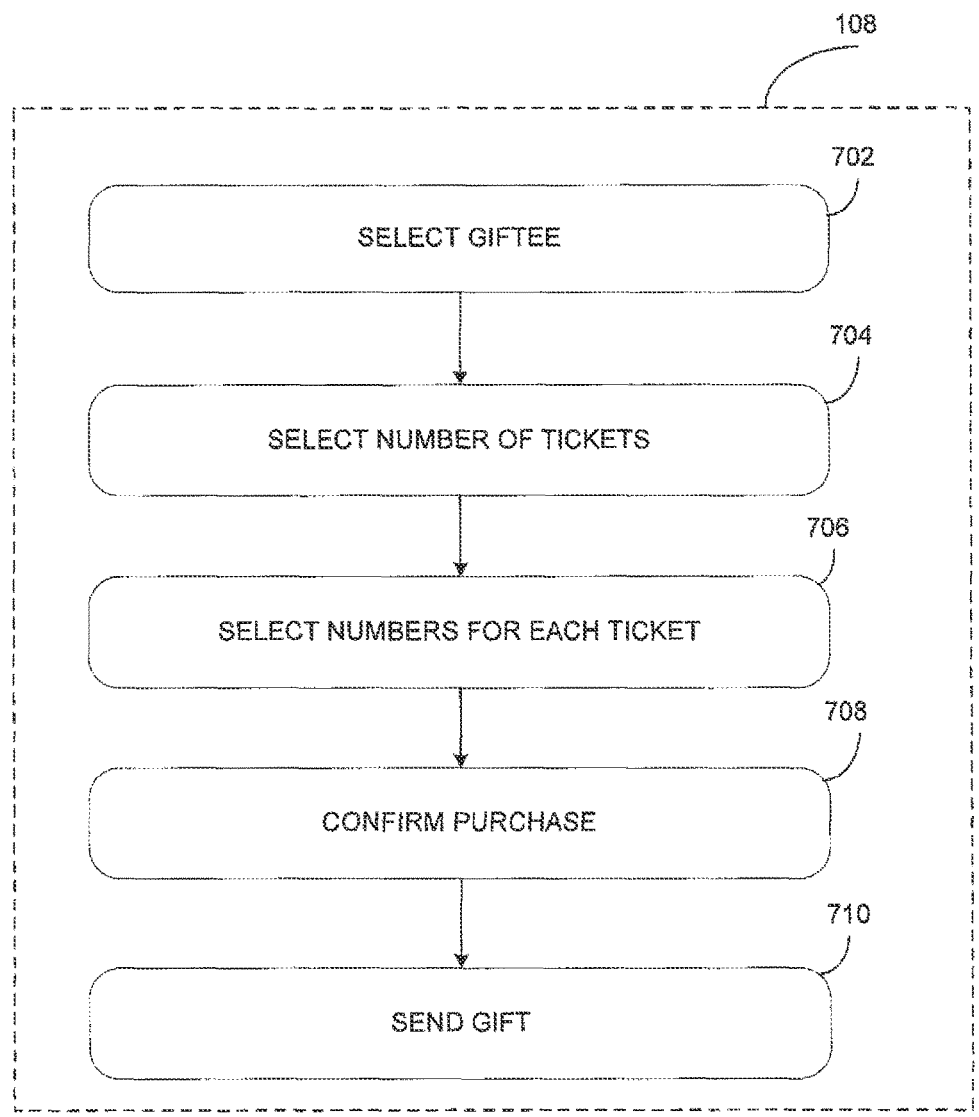
FIG. 7 is a flowchart illustrating an exemplary method for gifting to another player.

FIG. 7 is a flowchart illustrating an exemplary method for gifting a ticket. The giftee may be selected 702 from a list of friends, other players, group members, or any other variation. For example, a person not yet a player in the lottery may be invited to join the lottery by receiving a gift from an existing player. Once the giftee has been selected, the steps are similar to those for single play and group play. A number of tickets to gift is selected 704, the numbers for each ticket are selected 706, and the purchase is confirmed 708. The gift is then sent to the giftee 710.

Figure 8A:
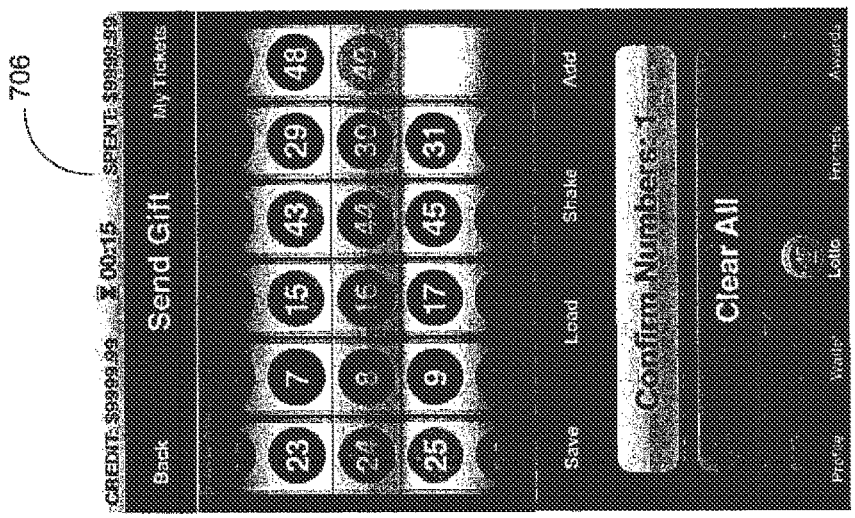
FIG. 8a is a screen shot illustrating an exemplary page for selecting a giftee.
Figure 8B:
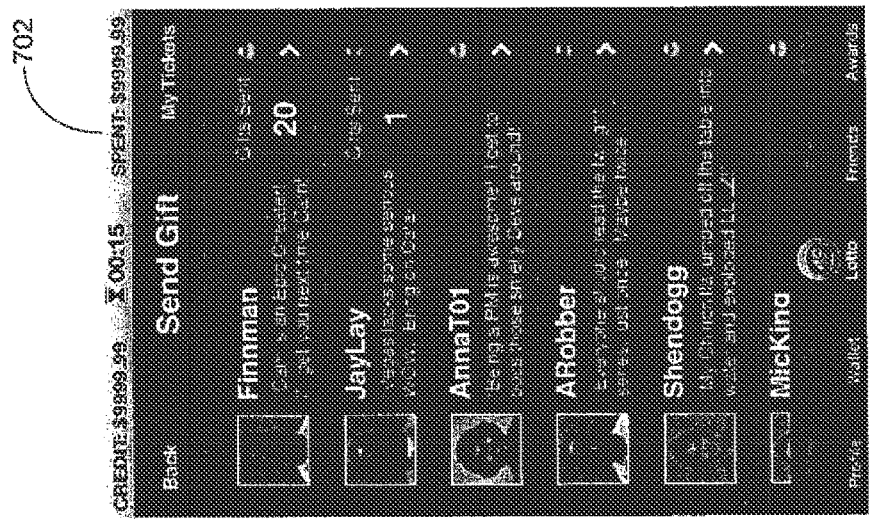
FIG. 8b is a screen shot illustrating an exemplary page for selecting numbers of a gift ticket.

FIG. 8a is a screenshot illustrating an exemplary page for selecting a giftee from a list 702. This page may indicate whether each person in the list has already been the recipient of a gift, either by the present gifter or by another player. This page may also indicate whether a gifted ticket has ever turned out to be a winning ticket. FIG. 8b is a screen shot illustrating an exemplary page for selecting the numbers for a ticket to be gifted. The embodiments described above with respect to single play and group play are applicable in this case as well.

Figure 8C:
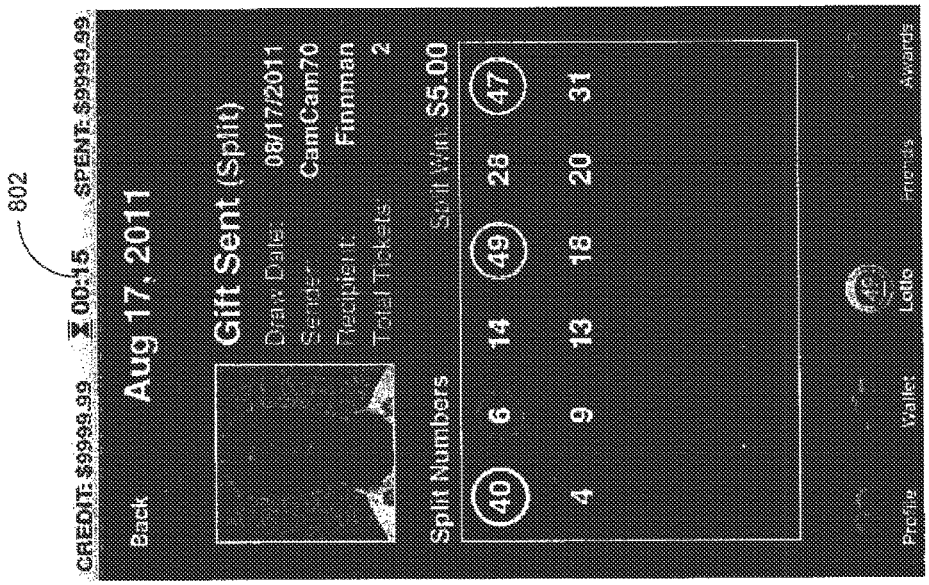
FIG. 8c is a screen shot illustrating an exemplary page for viewing details of a gift.

FIG. 8c is a screen shot of an exemplary page for viewing details of a gift sent. Any gift information may be provided on this page, such as a list of gift recipients, tickets for each recipient, draw dates, and draw results. Winnings for past gifted tickets may be displayed. A purchase for a future draw may indicate that the draw has not yet taken place.

In some embodiments, an entire ticket is gifted, with the gifter not retaining any rights to winnings resulting from the gifted ticket. In other embodiments, a portion of the winnings resulting from a gifted ticket may remain with the gifter. For example, the gifter may choose to split the ticket 50-50, 40-60, 72-28, 13-87, etc. These options may be pre-set by the game operator or free of choice for the player. Whatever the conditions of the gift, they are recorded by the game operator before a draw and applied in the case of a winning ticket.

Figure 9:
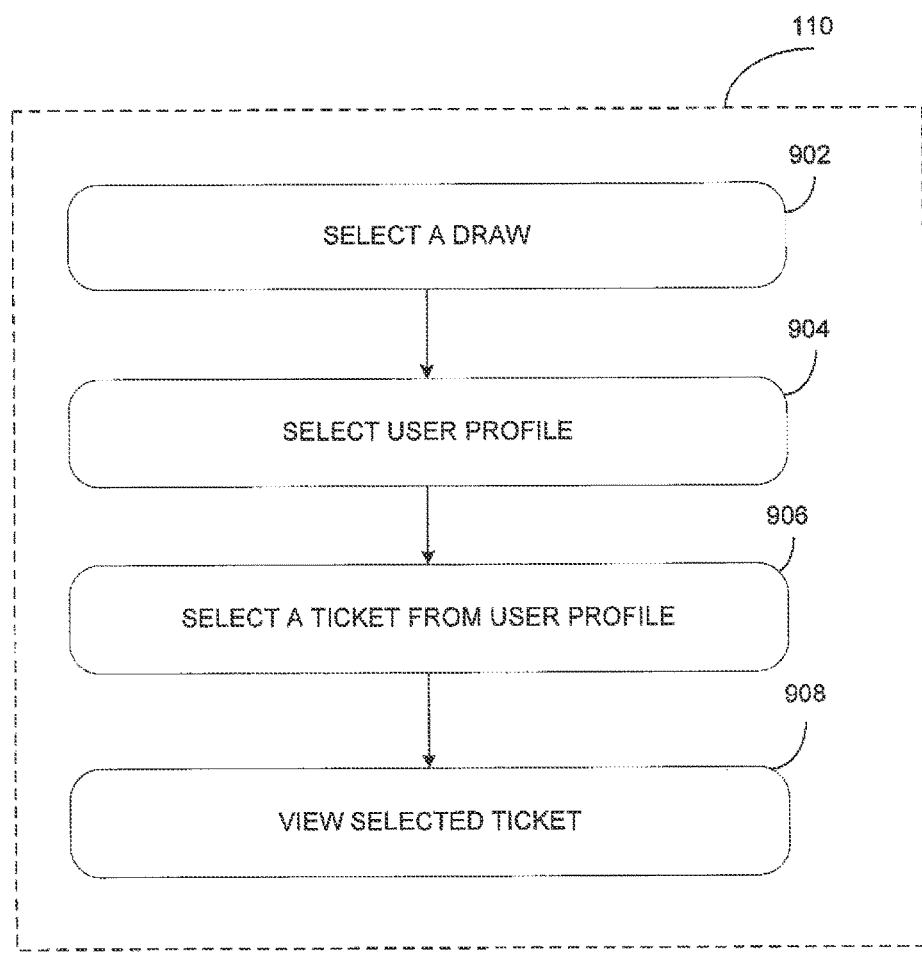
FIG. 9 is a flowchart illustrating an exemplary method for viewing winning numbers of present and past lottery draws.

FIG. 9 is a flowchart illustrating an exemplary method for accessing draw results and personal details with regards to individual draws 119. A given draw is selected by the player 902 from a list of present and/or past draws. This is illustrated in FIG. 10a. The information from any given draw is illustrated in an exemplary fashion in FIG. 10b. In this example, winning numbers, draw dates, prizes, and winners are provided on this page. In addition, the player's participation in the given draw is also detailed with regards to single play winnings, group play winnings, and total winnings.

Figure 10D:
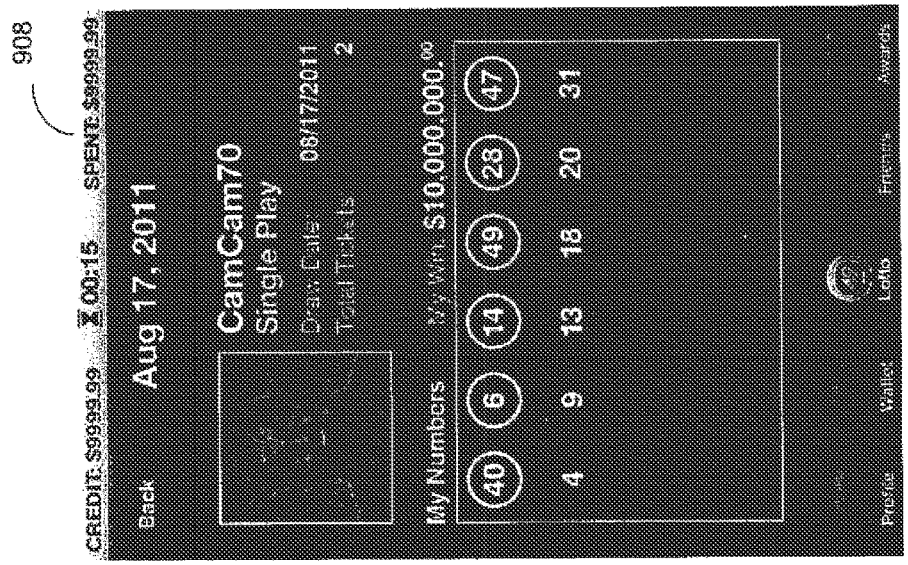
FIG. 10d is a screen shot illustrating an exemplary page displaying details of a purchase for a given ticket for a given draw.
Figure 10C:
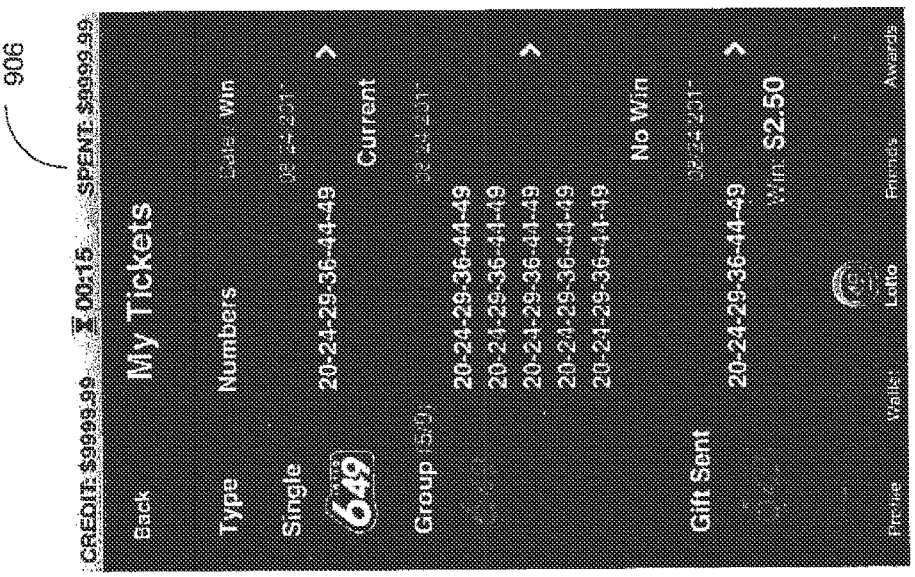
FIG. 10c is a screen shot illustrating an exemplary page displaying the players tickets, for selection of a given ticket.

If the player wants more details with regards to his own play for a given draw, he may select his own tickets or his user profile from the given draw for viewing ("my tickets") 904. FIG. 10c is an exemplary screen shot for the detailed ticket information for the given draw. The player may view another level of detail by selecting one ticket from the tickets purchased for the given draw 906 and viewing details regarding the selected ticket 908. FIG. 10d is an exemplary screen shot of a detailed view of a ticket for a given draw. Details regarding tickets, draws, and winnings may be organized according to various configurations, providing more or less information on any given page and allowing more or less detail to be obtained by the player.

Figure 11:
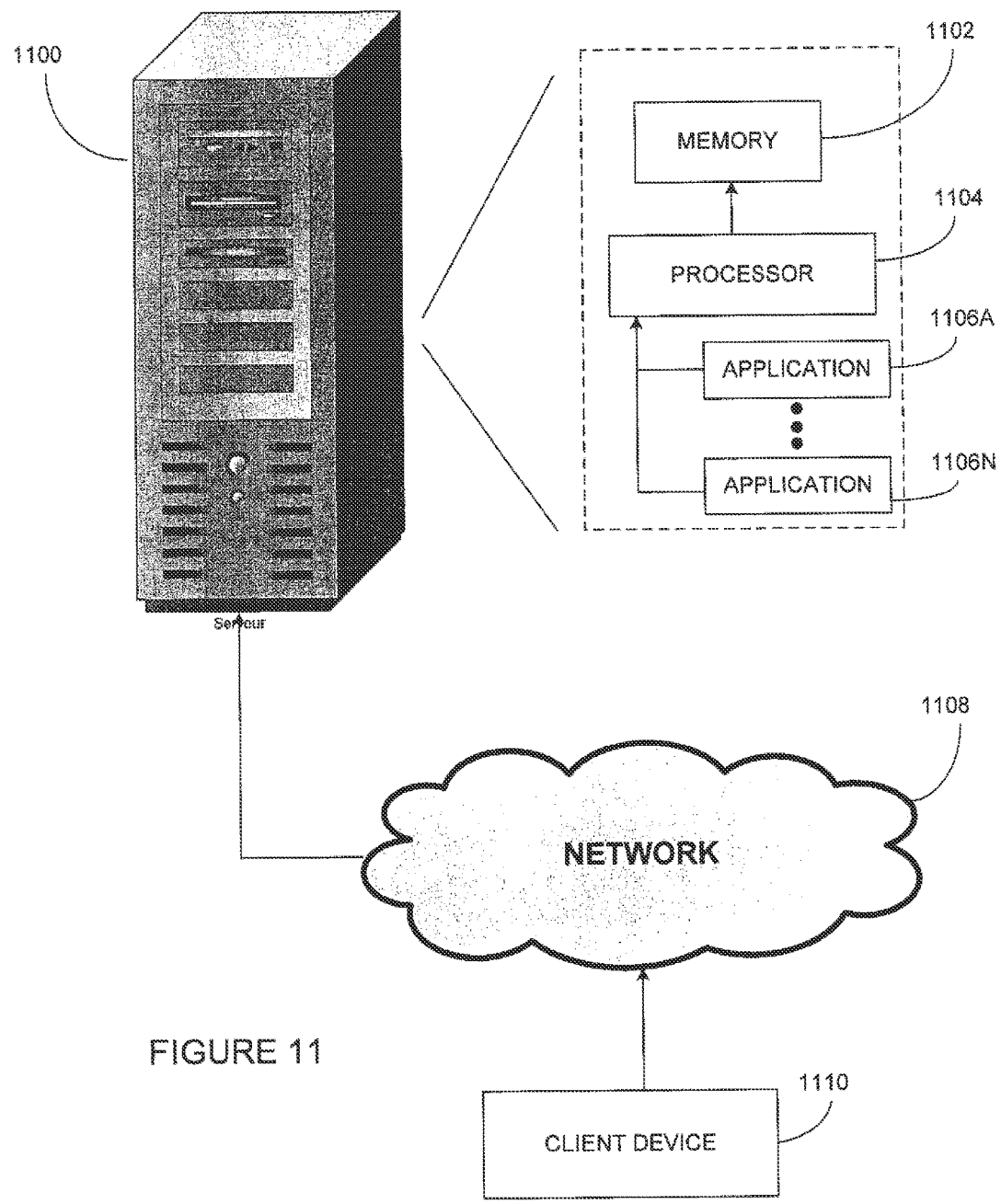
FIG. 11 is a schematic illustration of a system for executing the lottery application, in accordance with one embodiment.

Referring to FIG. 11, there is illustrated a system for executing the lottery application. One or more server(s) are provided remotely and accessible via a network 1108. For example, a series of servers corresponding to a web server, an application server, a database server, and a lottery server may be used. These servers are all represented by server 1100 in FIG. 11. The server 1100 is accessed by a client device 1110, such as a telephone, a computer, a personal digital assistant (PDA), an Iphone™, etc, via any type of network 1108, such as the Internet, the Public Switch Telephone Network (PSTN), a cellular network, or others known to those skilled in the art.

The server 1100 comprises, amongst other things, a plurality of applications 1106a . . . 1106n running on a processor 1104, the processor being coupled to a memory 1102. It should be understood that while the applications 1106a . . . 906n presented herein are illustrated and described as separate entities, they may be combined or separated in a variety of ways.

One or more databases (not shown) may be integrated directly into the memory 1102 or may be provided separately therefrom and remotely from the server 1100. In the case of a remote access to the databases, access may occur via any type of network 1108, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443" is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POPS (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 1102 accessible by the processor 1104 receives and stores data. The memory 1102 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor 1104 may access the memory 1102 to retrieve data. The processor 1104 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 1106a ... 1106n are coupled to the processor 1104 and configured to perform various tasks as explained below in more detail. An output may be transmitted to a client device 1110.

Figure 12:
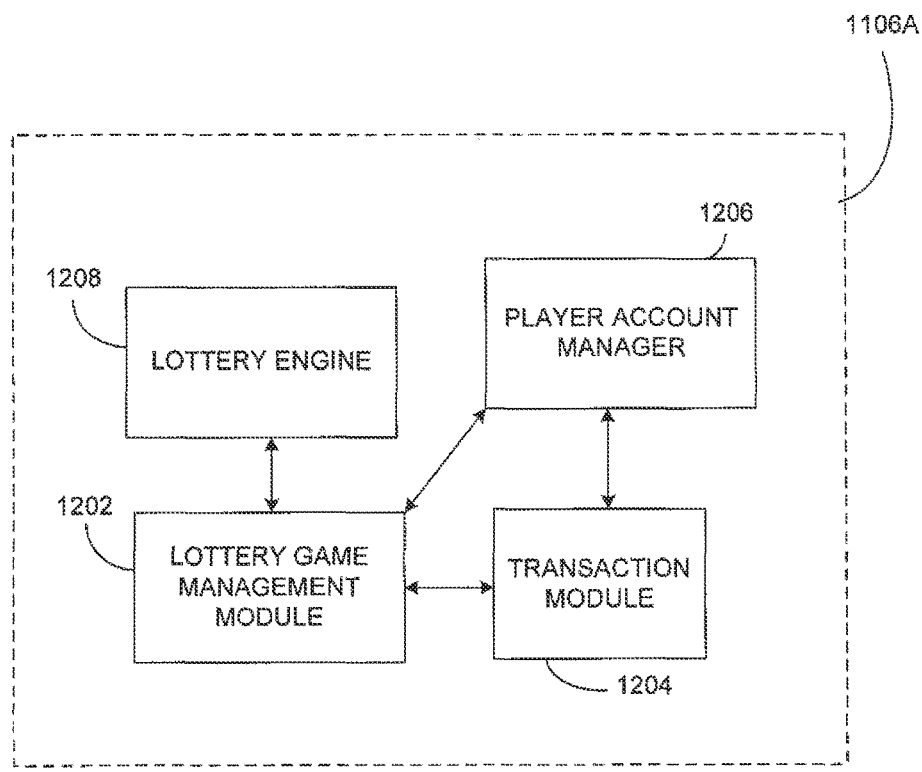
FIG. 12 is a block diagram illustrating an exemplary application running on the processor of the system of FIG. 11.

FIG. 12 illustrates an exemplary application 1106a running on the processor 1104. It will be appreciated that while the application 1106a illustrated in FIG. 12 is shown to run on the processor 1104 of the server 1100, it may also be provided in part or in whole directly on the client device 1110. When provided on the server 1100, the application 1106a may be accessed online via the client device 1110. Alternatively, the application 1106a may be run at least in part locally on the client device 1110 while communicating with the server 1100 via the network 1108.

The application 1106a comprises at least a lottery game management module 1202 and a lottery engine 1208. These two modules interact together in order to provide the online lottery game that is executable by the processor 1104 over the network 1108. The online lottery game can conduct a lottery transaction which issues a real lottery ticket from a government sanctioned lottery authority, the winnings being convertible to real world currency.

A transaction module 1204 is involved in the real world transactional aspects of the game. Real world transactions are involved when players purchase virtual currencies and when players redeem virtual currencies for real world currencies. Therefore, the transaction module 1204 interacts with the lottery game management module 1202. The transaction module 1204 also interacts with a player account manager 1206. The player account manager 1206 is responsible for managing player account functions, such as creating a player account, validating an existing player's login and password or a new player's eligibility to play the game, suspending a player's account, activating a player account, creating a player profile, viewing a player profile, viewing a current balance of a player's real money in a player account, and updating a current balance of a player's real money account.

The lottery engine 1208 may be responsible for all aspects of the lottery draws independent of the players, namely the draw itself to generate the winning numbers.

Figure 13:
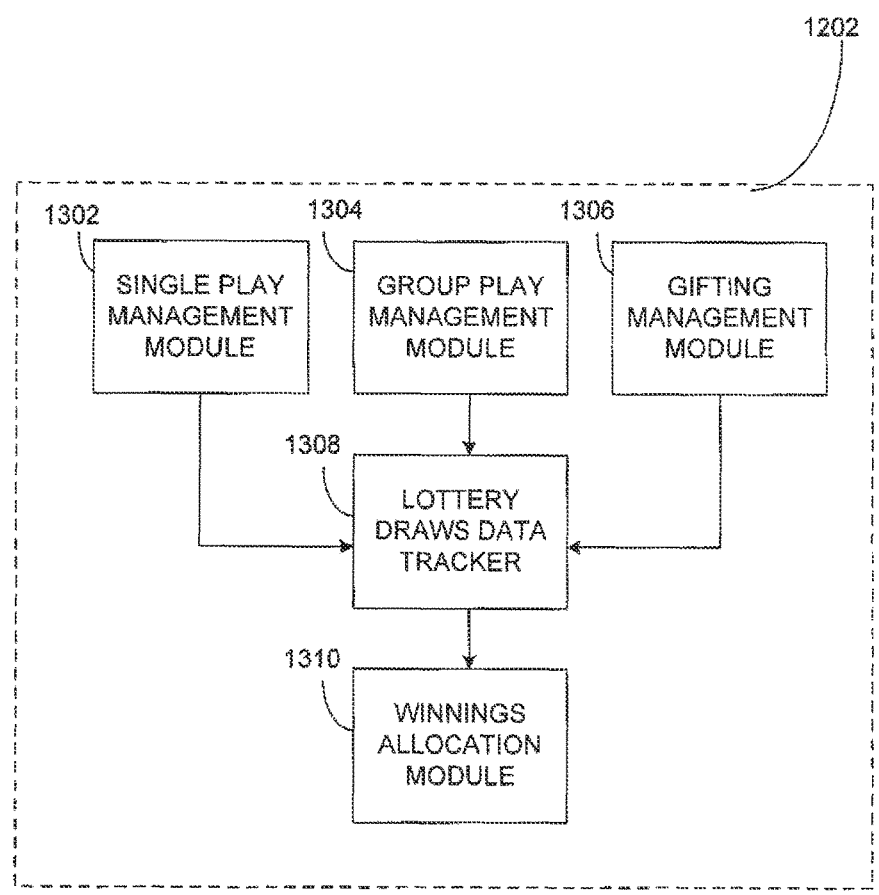
FIG. 13 is a block diagram illustrating an exemplary lottery application management module of FIG. 12.

FIG. 13 is a simplified exemplary embodiment of the lottery game management module 1202. Individual modules are provided to manage single play 1302, group play 1304, and gifting 1306. These modules are responsible for registering purchases of tickets and providing history and details regarding each purchase. These module are also responsible for applying the game conditions or settings for each type of purchase.

In some embodiments, the group play management module 1304 includes administrative tools to manage the group, such as adding, deleting, and blocking members from the group. Some of these tools may be provided only to the game operator, or they may be provided to the group administrator who may himself manage the group using these tools. In addition, the group play management module 1304 may include a communication module allowing group members to communicate with each other. Such communications may take place using various services, such as SMS, texting, email, postings, etc. These communication services may also be used for the creation of a group, i.e. inviting other players to join the group.

A lottery draws tracker 1308 receives draw data from the lottery engine 1208 and stores this data. A winnings allocation module 1310 is connected to the lottery draws tracker 1308. When a new set of draw numbers come into the lottery draws tracker 1308, the winnings allocation module 1310 will determine if any tickets purchased through single play, group play, or gifting constitute a partial or complete winning combination and the winnings will be allocated accordingly.

Figure 14:
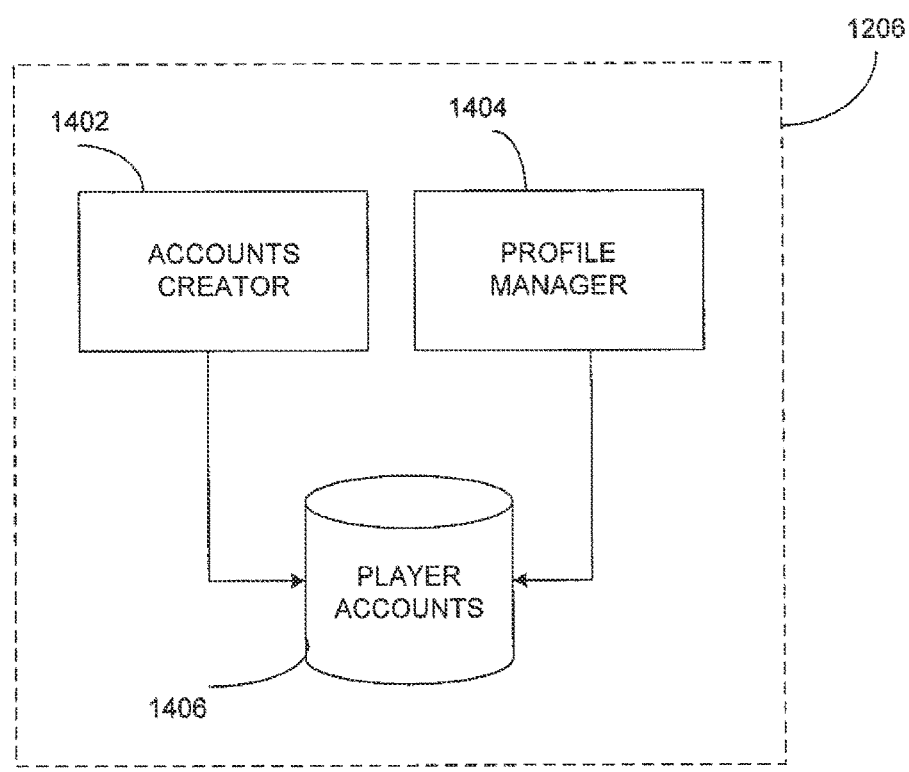
FIG. 14 is a block diagram illustrating an exemplary player account manager for the application of FIG. 12.

FIG. 14 illustrates in more detail the player account manager 1008 of FIG. 12. An accounts creator 1402 handles the creation of the account, acquisition of personal information of the player, acquisition of financial information of the player, and the general creation of a player profile. The player accounts/profiles are maintained in a database 1406 and updated by a profile manager 1404. The profile manager 1404 will update the player accounts 1406 whenever new information is available for a player. The new information may have to do with winnings or purchases, updated personal information, updated financial information, etc.

The following is an exemplary description of the interaction of the various modules of FIGS. 11 to 14 in accordance with game play. When a player launches application 1106a on his client device 1110, the player account manager 1206 will either set up a new account for a new player or access an existing account for an existing player. In the case of a new player, various required information is obtained from the player and recorded in the player account database 1406.

To open an account, the player purchases virtual currency or provides real currency in an account. The transaction module 1204 will perform a financial transaction and issue the requested currency. The player account database 1406 is updated with this new information once the currency has been provided for the player.

As the player purchases single play and/or group play tickets and/or sends gifts, the lottery game application module 1202 manages the player profile and applies gaming conditions or settings as determined by the game operator. When a draw is performed by the lottery engine 1208, the lottery game management module 1202 keeps track of winning numbers and may push the draw data to each player account. Alternatively, the lottery game management module 1202 may store the information and provide it on a per-request basis. The lottery game management module 1202 applies the settings of group play in case of a winning group ticket. It also applies the settings of gifted tickets in the case of a winning ticket that has been gifted. Finally, the lottery game management module 1202 applies the settings of single play by allocating winnings on the basis of winning tickets (or partially winning tickets, as per the game conditions). The lottery game management module 1202 registers purchases and interacts with the player account manager 1206 to keep track of current and past purchases and winnings. It also allocates winnings to player accounts 1406.

The transaction module 1204 will be involved in the transactional aspects of purchasing and redeeming credits, and the player account manager 1206 is updated with any new information to the player's account. If purchases are made with real money from a player's account, the transaction module will be involved in all transactions for lottery tickets and allocations of winnings.

In one embodiment, the application 1106a is also designed to allow multiple lottery operators to cooperate and share player/ticket information such that players and group members can belong to more than one jurisdiction, winnings can be shared across jurisdictions, and sales and commissions can be paid across different jurisdictions. A single transaction module 1204 may be provided to manage transactions across multiple jurisdictions, or multiple transaction modules 1204 may be provided and adapted to interact together when players or winnings cross jurisdictions. Similarly, a single lottery game management module 1202 may be provided to manage lotteries from multiple lottery operators, or multiple lottery game management modules 1202 may de provided and adapted to interact together when players or winnings cross jurisdictions. Also alternatively, some modules may be duplicated while others are not. Services or features that may be operated independently of a lottery operator and/or a jurisdiction may be provided within a single unit, while services or features that are operator and/or jurisdiction dependent may be duplicated for each operator and/or jurisdiction. For example, there may be multiple lottery engines 1208 all being managed by a single lottery game management module 1202, or there may be multiple player account managers 1206 but only one transaction module 1204 that interacts with the different player account managers 1206.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carded out as a method, can be embodied in a system, and/or a computer readable medium. The embodiments of the invention described above are intended to be exemplary only. The scope of the invention is therefore intended to be limited solely by the scope of the appended claims.

The invention claimed is:

1. A system for managing electronic records involving a plurality of player accounts, the system comprising:
a processor in a centralized computer system in electronic communication with a remotely located device associated with at least one player account of the plurality of player accounts, the device including at least a display;
a memory accessible by the processor; and
at least one application stored in the memory and having program code executable by the processor for:
maintaining, on the memory, one or more structured data storage elements configured to store, as data objects, records corresponding to ticket purchase selections for at least one lottery draw, each structured data storage element corresponding to a specific group play instance for a group of players and including dynamically updated fields tracking proportionate stakes in potential winnings as new ticket purchase selections are made and a counter object tracking a highest stake among the group of players for the specific group play instance;
controlling rendering, on the display at the device associated with the at least one player account, a user interface including a plurality of visual interface elements representing characteristics of a group play mechanism including a first set of visual elements representing a corresponding total number of group plays initiated by each of one or more group play groups based at least on the data objects stored on the one or more structured data storage elements, and a second set of visual elements representing a corresponding highest stake for each of the one or more group play groups based at least on the data objects stored on the one or more structured data storage elements,
the user interface adapted to render a purchase confirmation button configured to be responsive to a player input that permits a corresponding player associated with the at least one player account to confirm acceptance of a set of group play settings which must be accepted before the at least one player account is added to a group by entering the player input, the group play settings including settings dictating participating and non-participating group member stakes for the group;
upon receiving, by the processor, an electronic data signal representing the player input indicative of a confirmation of acceptance of the set of group play settings from the device associated with the at least one player account, adding, by the processor, the at least one player account as a member of the group tracked on the one or more structured data storage elements;
receiving, by the processor, data representing the ticket purchase selections for the at least one lottery draw, at least one of the ticket purchase selections corresponding to a group purchase for the group to participate in the at least one lottery draw, each one of the ticket purchase selections associated with at least one player account;
encoding each of the at least one ticket purchase selections corresponding to the group purchase in a corresponding electronic record by updating the one or more data objects stored within a structured data storage element corresponding to the group play instance, the corresponding electronic record including an identifier indicating the electronic record is associated with the group;
responsive to the encoding of the at least one ticket purchase selections in the corresponding electronic record, controlling the user interface to update one or more renderings associated with (i) the first set of visual elements representing the corresponding total number of group plays initiated by each of the one or more group play groups, and (ii) the second set of visual elements representing a corresponding highest stake for each of the one or more group play groups;
wherein the first set of visual elements are updated to increment the corresponding total number of group plays based on the corresponding electronic record extracted from the one or more structured data storage elements; and the second set of visual elements are updated to increment the corresponding highest stake for the corresponding group play group upon a determination that the encoding of the at least one ticket purchase selections in the corresponding electronic record extracted from the one or more structured data storage elements has caused the highest stake associated with the corresponding at least one player account to increase beyond a prior corresponding highest stake for the corresponding group play group;

receiving, by the processor, a set of draw numbers corresponding to a winning combination for the at least one lottery draw;

determining, by the processor, if any of the ticket purchase selections is a winning ticket purchase selection by determining if any of the ticket purchase selections constitutes a partial or complete winning combination by comparing the corresponding electronic record extracted from the one or more structured data storage elements with a data set representing the set of draw numbers corresponding to the combination;

updating the one or more structured data storage elements and the at least one player account to allocate, by the processor, winnings to the at least one player account associated with the winning ticket purchase selection from the group in accordance with the set of group play settings; and parsing the one or more structured data storage elements and each of the electronic records associated with the at least one player account to identify electronic ticket purchase selections associated with the group, and based on the identification of the electronic records associated with the group, rendering for display at the device associated with the at least one player account, the user interface including ticket purchase selections corresponding to the at least one player account as a single play, and ticket purchase selections corresponding to the at least one player account as a group play.

2. The system of claim 1, wherein the at least one application is configured to allocate winnings to the at least one player account by distributing winnings in separate player accounts for each member of the group in accordance with the group play settings.

3. The system of claim 1 or 2, wherein the at least one application is further configured to assign the group purchase to a purchase initiating group member for consideration in accordance with the set of group play settings.

4. The system of any one of claims 1 to 3, wherein the at least one application is further configured to record a total number of group purchases for the at least one lottery draw for consideration in accordance with the set of group play settings.

5. The system of any one of claims 1 to 4, wherein the at least one application is further configured to receive the set of group play settings from the group preceding the group purchase.

6. The system of any one of claims 1 to 4, wherein the at least one application is further configured to receive the set of group play settings from the group with the group purchase.

7. The system of any one of claims 1 to 6, wherein at least one of the ticket purchase selections received corresponds to a gifted ticket at least partially gifted from a gifter to a giftee, and the at least one application is further configured to associate the gifted ticket to a gifter player account and a giftee player account, and wherein winnings are allocated for a winning gifted ticket in accordance with a set of gifting options for sharing the gifted ticket.

8. The system of claim 7, wherein the at least one application is further configured to receive the set of gifting options for sharing the gifted ticket with the purchase for the gifted ticket.

9. The system of claim 7 or 8, wherein the set of gifting options for sharing the gifted ticket comprise a percentage of winnings for the gifter and a percentage of winnings for the giftee.

10. A computer-implemented method for managing electronic records involving a plurality of player accounts on a centralized computer system in electronic communication with a remotely located device associated with at least one player account of a plurality of player accounts, the device including at least a display, the method comprising:

maintaining, on computer memory, one or more structured data storage elements configured to store, as data objects, records corresponding to ticket purchase selections for at least one lottery draw, each structured data storage element corresponding to a specific group play instance for a group of players and including dynamically updated fields tracking proportionate stakes in potential winnings as new ticket purchase selections are made and a counter object tracking a highest stake among the group of players for the specific group play instance;

controlling rendering, on the display at the device associated with the at least one player account of the plurality of player accounts, a user interface including a plurality of visual interface elements representing characteristics of a group play mechanism including a first set of visual elements representing a corresponding total number of group plays initiated by each of one or more group play groups based at least on the data objects stored on the one or more structured data storage elements, and a second set of visual elements representing a corresponding highest stake for each of the one or more group play groups based at least on the data objects stored on the one or more structured data storage element, the user interface adapted to render a purchase confirmation button configured to be responsive to a player input that permits a corresponding player associated with the at least one player account to confirm acceptance of a set of group play settings which must be accepted before the at least one player account is added to a group by entering the player input, the group play settings including settings dictating participating and non-participating group member stakes for the group;

upon receiving, by a processor, an electronic data signal representing the player input indicative of a confirmation of acceptance of the set of group play settings from the device associated with the at least one player account, adding, by the processor, the at least one player account as a member of the group tracked on the one or more structured data storage elements;

receiving, by the processor, data representing the ticket purchase selections for the at least one lottery draw, at least one of the ticket purchase selections corresponding to a group purchase for the group to participate in the at least one lottery draw, each one of the ticket purchase selections associated with at least one player account;

encoding each of the at least one ticket purchase selections corresponding to the group purchase in a corresponding electronic record by updating the one or more data objects stored within a structured data storage element corresponding to the group play instance, the corresponding electronic record including an identifier indicating the electronic record is associated with the group;

responsive to the encoding of the at least one ticket purchase selections in the corresponding electronic record, controlling the user interface to update one or more renderings associated with (i) the first set of visual elements representing the corresponding total number of group plays initiated by each of the one or more group play groups, and (ii) the second set of visual elements representing a corresponding highest stake for each of the one or more group play groups;

wherein the first set of visual elements are updated to increment the corresponding total number of group plays based on the corresponding electronic record extracted from the one or more structured data storage elements; and the second set of visual elements being updated to increment corresponding highest stake for the corresponding group play group upon a determination that the encoding of the at least one ticket purchase selections in the corresponding electronic record extracted from the one or more structured data storage elements has caused the highest stake associated with the corresponding at least one player account to increase beyond a prior corresponding highest stake for the corresponding group play group;

receiving, by the processor, a set of draw numbers corresponding to a winning combination for the at least one lottery draw;

determining, by the processor, if any of the ticket purchase selections is a winning ticket purchase selection by determining if any of the ticket purchase selections constitutes a partial or complete winning combination by comparing the corresponding electronic record extracted from the one or more structured data storage elements with a data set representing the set of draw numbers corresponding to the combination;

updating the one or more structured data storage elements and the at least one player account to allocate, by the processor, winnings to the at least one player account associated with the winning ticket purchase selection from the group in accordance with the set of group play settings; and parsing the one or more structured data storage elements and each of the electronic records associated with the at least one player account to identify electronic ticket purchase selections associated with the group, and based on the identification of the electronic records associated with the group, rendering for display at the device associated with the at least one player account, the user interface including ticket purchase selections corresponding to the at least one player account as a single play, and ticket purchase selections corresponding to the at least one player account as a group play.

11. The method of claim 10, wherein allocating winnings to the at least one player account comprises distributing winnings in separate player accounts for each member of the group in accordance with the group play settings dictating the participating and non-participating group member stakes.

12. The method of claim 10 or 11, further comprising assigning the group purchase to a purchase initiating group member for consideration in the set of group play settings.

13. The method of any one of claims 10 to 12, further comprising recording a total number of group purchases for the at least one lottery draw for consideration in the set of group play settings.

14. The method of any one of claims 10 to 13, further comprising receiving the set of group play settings from the group preceding the group purchase.

15. The method of any one of claims 10 to 13, wherein receiving ticket purchase selections comprises receiving the set of group play settings applicable for the at least one lottery draw with the group purchase.

16. The method of any one of claims 10 to 15, wherein at least one of the ticket purchase selections received corresponds to a gifted ticket at least partially gifted from a gifter to a giftee, and further comprising associating the gifted ticket to a gifter player account and a giftee player account, and wherein winnings are allocated for a winning gifted ticket in accordance with a set of gifting options for sharing the gifted ticket.

17. The method of claim 16, further comprising receiving the set of gifting options for sharing the gifted ticket with the purchase for the gifted ticket.

18. The method of claim 16 or 17, wherein the set of gifting options for sharing the gifted ticket comprise a percentage of winnings for the gifter and a percentage of winnings for the giftee.

19. The method of any one of claims 16 to 18, wherein the gifted ticket is a group purchase, the gifter is the purchase initiating group member and a portion of the winnings allocated to the giftee is taken only from a stake of the purchase initiating group member in the group purchase.

20. A non-transitory computer-readable storage medium having stored thereon program code executable by a processor for managing electronic records involving a plurality of player accounts on a centralized computer system in electronic communication with a remotely located device associated with at least one player account of a plurality of player accounts, the device including at least a display, by:

maintaining, on computer memory, one or more structured data storage elements configured to store, as data objects, records corresponding to ticket purchase selections for at least one lottery draw, each structured data storage element corresponding to a specific group play instance for a group of players and including dynamically updated fields tracking proportionate stakes in potential winnings as new ticket purchase selections are made and a counter object tracking a highest stake among the group of players for the specific group play instance;

controlling rendering, on the display at the device associated with the at least one player account of the plurality of player accounts, a user interface including a plurality of visual interface elements representing characteristics of a group play mechanism including a first set of visual elements representing a corresponding total number of group plays initiated by each of one or more group play groups based at least on the data objects stored on the one or more structured data storage elements, and a second set of visual elements representing a corresponding highest stake for each of the one or more group play groups based at least on the data objects stored on the one or more structured data storage elements, the user interface adapted to render a purchase confirmation button configured to be responsive to a player input that permits a corresponding player associated with the at least one player account to confirm acceptance of a set of group play settings which must be accepted before the at least one player account is added to a group by entering the player input, the group play settings including settings dictating participating and non-participating group member stakes for the group;

upon receiving, by the processor, an electronic data signal representing the player input indicative of a confirmation of acceptance of the set of group play settings from the device associated with the at least one player account, adding, by the processor, the at least one player account as a member of the group tracked on the one or more structured data storage elements;

receiving, by the processor, data representing the ticket purchase selections for the at least one lottery draw, at least one of the ticket purchase selections corresponding to a group purchase for the group to participate in the at least one lottery draw, each one of the ticket purchase selections associated with at least one player account;

encoding each of the at least one ticket purchase selections corresponding to the group purchase in a corresponding electronic record by updating the one or more data objects stored within a structured data storage element corresponding to the group play instance, the corresponding electronic record including an identifier indicating the electronic record is associated with the group;

responsive to the encoding of the at least one ticket purchase selections in the corresponding electronic record, controlling the user interface to update one or more renderings associated with (i) the first set of visual elements representing the corresponding total number of group plays initiated by each of the one or more group play groups, and (ii) the second set of visual elements representing a corresponding highest stake for each of the one or more group play groups;

wherein the first set of visual elements are updated to increment the corresponding total number of group plays based on the corresponding electronic record extracted from the one or more structured data storage elements; and the second set of visual elements being updated to increment corresponding highest stake for the corresponding group play group upon a determination that the encoding of the at least one ticket purchase selections in the corresponding electronic record extracted from the one or more structured data storage elements has caused the highest stake associated with the corresponding at least one player account to increase beyond a prior corresponding highest stake for the corresponding group play group;

receiving, by the processor, a set of draw numbers corresponding to a winning combination for the at least one lottery draw;

determining, by the processor, if any of the ticket purchase selections is a winning ticket purchase selection by determining if any of the ticket purchase selections constitutes a partial or complete winning combination;

updating the one or more structured data storage elements and the at least one player account to allocate, by the processor, winnings to the at least one player account associated with the winning ticket purchase selection from the group in accordance with the set of group play settings; and parsing the one or more structured data storage elements and each of the electronic records associated with the at least one player account to identify electronic ticket purchase selections associated with the group, and based on the identification of the electronic records associated with the group, rendering for display at the device associated with the at least one player account, the user interface including ticket purchase selections corresponding to the at least one player account as a single play, and ticket purchase selections corresponding to the at least one player account as a group play.

* * * * *